United States Patent
Yanaka et al.

(10) Patent No.: US 6,711,457 B2
(45) Date of Patent: Mar. 23, 2004

(54) WORKING MACHINERY FOR ELONGATED WORK

(75) Inventors: Satoru Yanaka, Yokosuka (JP); Katsuhiro Sato, Yokohama (JP); Yasuo Nagase, Yokohama (JP); Hiroshi Noguchi, Tokyo (JP); Kazuto Sasaki, Yokohama (JP); Hiromichi Nakabayashi, Kawasaki (JP); Syouji Inagawa, Kawasaki (JP); Masahiro Kasiwa, Kawasaki (JP); Hitoshi Furugori, Kawasaki (JP); Kouji Oonishi, Kawasaki (JP); Nobuhiro Abe, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 30 days.

(21) Appl. No.: 09/842,118

(22) Filed: Apr. 26, 2001

(65) Prior Publication Data
US 2003/0215312 A1 Nov. 20, 2003

(30) Foreign Application Priority Data
Apr. 27, 2000 (JP) ........................................ 2000-127078
Apr. 27, 2000 (JP) ........................................ 2000-127079

(51) Int. Cl.[7] .............................................. G06F 7/00
(52) U.S. Cl. .................. 700/213; 700/100; 414/226.02; 414/745.1; 414/745.7
(58) Field of Search ...................... 414/222.01, 222.11, 414/222.12, 745.1, 745.7, 806, 225.01, 226.02; 198/341.07, 345.1, 346.1; 242/441.2; 700/100, 213

(56) References Cited

U.S. PATENT DOCUMENTS 4,951,802 A * 8/1990 Weissgerber et al. ..... 198/346.1

* cited by examiner

Primary Examiner—Eileen D. Lillis
Assistant Examiner—Michael Lowe
(74) Attorney, Agent, or Firm—Oblon, Spivak, McClelland, Maier & Neustadt, P.C.

(57) ABSTRACT

Working machinery for working an elongated work comprises a work stocker configured to store a plurality of works, a work carrying-in machine configured to carry in the works from the work stocker to a working area, a positioning device configured to position the work in the working area, a work clamper provided in the working area and configured to clamp the work in a vertical direction, a plurality of working machines arranged on both sides of the working clamper to work the elongated work from both sides of the work, a plurality of driving devices configured to move the working machines respectively in a longitudinal direction, a controller configured to control the working machines and the driving device, and a work carrying-out machine configured to carry out the work which is completed in working from the working area.

18 Claims, 15 Drawing Sheets

WORKING MACHINERY FOR ELONGATED WORK

CROSS-REFERENCE TO RELATED APPLICATIONS

This application is based upon and claims the benefit of priority from the prior Japanese Patent Applications No. 2000-127078, filed Apr. 27, 2000; and No. 2000-127079, filed Apr. 27, 2000, the entire contents of both of which are incorporated herein by reference.

BACKGROUND OF THE INVENTION

The present invention relates to working machinery for an elongated work for working the elongated work, and more particularly to working machinery for an elongated work suitable for forming a rotor coil for use in a turbine generator, a guide tube for use in a control rod drive of a nuclear reactor.

For example, a rotor coil used in a turbine generator and a guide tube used in a control rod drive of a nuclear reactor are usually formed by using an elongated work (a steel strip). FIGS. 16A to 16C show one example of punching, grooving and edge working applied to a work W for forming the rotor coil and the guide tube. Conventionally, such work working is conducted subsequently in order with the working machinery by arranging a plurality of working machinery for deflashing and finishing the work on both sides of the conveyer machine and sending the work in a longitudinal direction to position the work at a predetermined position in addition to the working machinery for punching, grooving, and edge working as shown in FIGS. 16A to 16C.

However, according to the conventional working method, there is a problem in that a carrying conveyer having a long carrying channel is required for carrying an elongated work having a length of about 10 m, the working machinery for the elongated work is enlarged so that the cost of the machinery comes too high.

Furthermore, there has been also a problem in that the elongated work must be positioned for punching, grooving, edge working, deflecting, finishing or the like so that it takes a long time and the working cost becomes high. Furthermore, there has been also a problem in that since part of the carrying in and out a work to and from the working machinery and the working are manually conducted, the working efficiency is low and the working cost also increases.

An object of the present invention is to provide working machinery for working an elongated work, the machinery being capable of automating a series of work for working the elongated belt hook for forming a product such as a rotor coil, a guide tube or the like, the machinery being capable of shortening the working time, and conducting an efficient working.

BRIEF SUMMARY OF THE INVENTION

According to a first aspect of the present invention, there is provided working machinery for working an elongated work comprising a work stocker configured to store a plurality of works, a work carrying-in machine configured to carry in the works from the work stocker to a working area, a positioning device configured to position the work in the working area, a work clamper provided in the working area and configured to clamp the work in a vertical direction, a plurality of working machines arranged on both sides of the working clamper to work the elongated work from both sides of the work, a plurality of driving devices configured to move the working machines respectively in a longitudinal direction, a controller configured to control the working machines and the driving device, and a work carrying-out machine configured to carry out the work which is completed in working from the working area.

According to the structure, the elongated work is taken out from the work stocker with the work carrying-in machine one by one to be transferred to the work clamper in the working area. In the working area, the work clamped in a vertical state is worked from both sides with the working machine such as a machining center or the like. The working machine conducts a predetermined working while being moved to a longitudinal direction of the work and in a direction intersecting the work. The work completely worked is carried out from the working area with the work carrying-out machine to be transferred to the next step. According to the present invention, since the elongated work is simultaneously worked from both sides with a movable working machine, it is not required to send the work, and working time can be shortened. In addition, working machinery for an elongated work can be obtained which is capable of reducing the size of the machinery and improving the work efficiency.

According to a second aspect of the present invention, there is provided a method for working an elongated work, comprising the steps of carrying in the work in a working area from a work stocker in which a plurality of works are stored, clamping the work in a vertical direction in the working area, arranging a plurality of working machines on both sides of the work, simultaneously performing a plurality of workings while moving the working machines in a longitudinal side of the work to carry out the work which is completely worked from the working area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
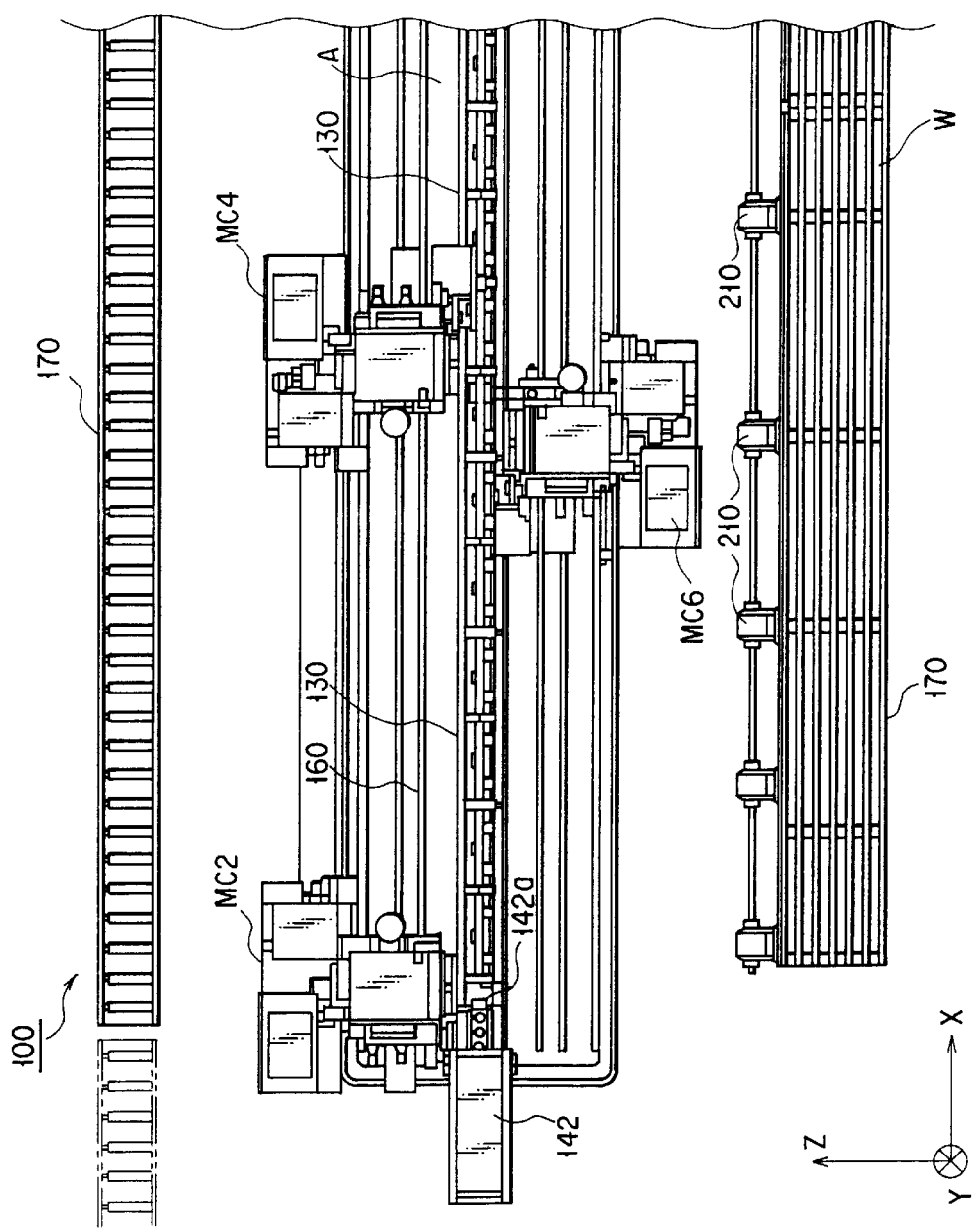
FIG. 1 is a plan view showing a half of one side of working machinery for an elongated work according to one embodiment of the present invention.

Hereinafter, embodiments of the present invention will be explained in detail by referring to the drawings.

[Explanation of the Overall Structure]

Working machinery 100 for an elongated work has a work stocker 110 for storing a plurality of elongated works W for forming a rotor coil and a guide tube, and a work clamper 130 provided approximately in the center of the working area A of the working machine 100 for the elongated work for clamping the work W to be worked in a vertically erected state. On both sides of this work clamper 130, machining centers MC1 to MC6, a guide 160, a work carrying-out conveyer 170, a work conveyer machine 180 and a work reversing device 210 are arranged.

The machining centers MC1 and MC6 function as working machinery for working a work W while advancing and retreating in a direction of Y toward the work W. The guide 160 moves the machining centers MC1 to MC6 along a longitudinal side (a direction of x) of the work W clamped with the work clamper 130. The work carrying-out conveyer 170 carries out the work W which is completely worked from the working machine 100 for working an elongated work. The work conveyer machine 180 (see FIG. 3) takes out the work W one after another from the work stocker 110 to carry the work to the working area and to carry the completely worked work W to the work carrying-out conveyer 170. The work reversing device 210 reverses the work W. The control system controls the operation of each of these portions.

[Work Stocker]

The work stocker 110 according to this embodiment can store, for example, elongated works W having a width of 40 mm, a thickness of 5 mm and a length of 10 m in eight rows and twenty steps (160 sheets in total) in the state in which the works W are horizontally stacked. On the work W stored in this work stocker 110, a numeral or a symbol is attached in advance in accordance with the size of the work and the working form thereof. This numeral and symbol corresponds to the storage position of the work W in the work stocker 110. The storage position for each of the work W in the work stocker 110 is controlled for each of the works W with the control system which will be described later.

[Work Clamper]

Approximately in the center of the working machine 100 for an elongated work, a bed 101 is arranged in a direction of X. Approximately in the center of this bed 101, a working area A is provided for working the work W. The work clamper 130 clamps an elongated work W in a vertical state with one of long sides located opposite to each other directed upward while the other of the long sides directed downward. Furthermore, the work clamper 130 is provided so as to clamp the work W in the working area A at a plurality of positions (for example, twenty positions) in an approximately equal interval along a longitudinal direction (a direction of X) of the work W. Hereinafter, by referring to FIGS. 4A and 4B, a work clamper 130 will be explained.

Figure 4A:
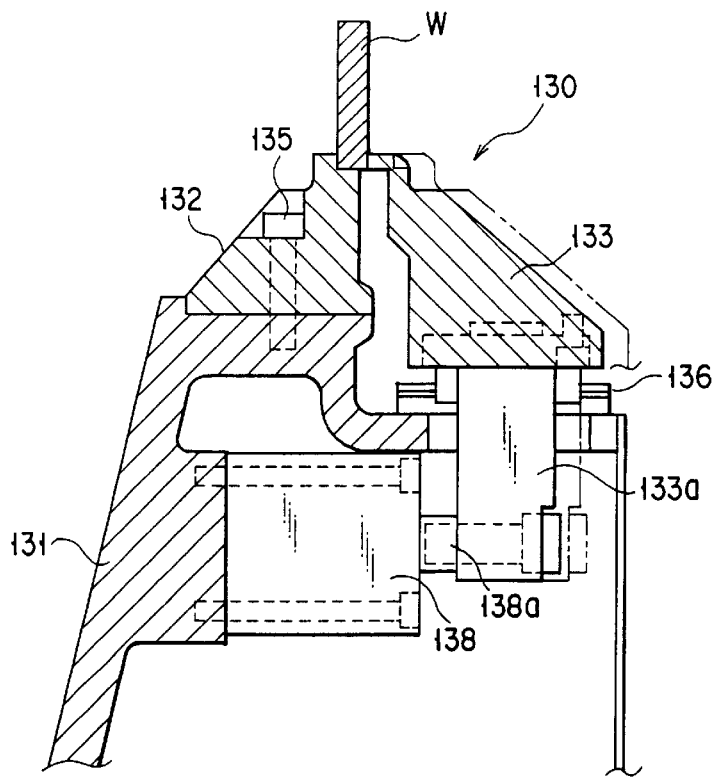
FIG. 4A is a sectional view showing a work clamper for clamping the work in a working area.
Figure 4B:
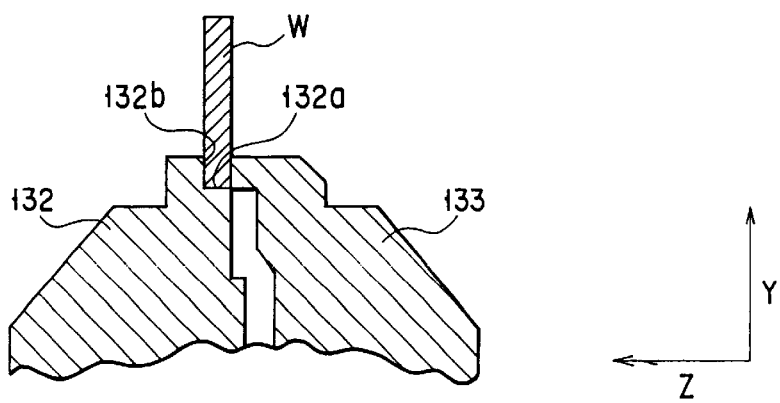
FIG. 4B is an enlarged view showing a portion for clamping the work in the work clamper of FIG. 4A.

FIG. 4A is a sectional view showing a work clamper for clamping the work in the working area A. FIG. 4B is an enlarged view of a portion for clamping the work in the work clamper of FIG. 4A. The work clamper 130 has a clamper body 1 integrally formed with the bed 101, a fixed clamper 132 which is fixed on the clamper body 131 with a bolt 135, and a movable clamper 133 movable in a direction of clamping and unclamping with respect to the fixed clamper 132.

The fixed clamper 32 is formed as a single clamper which extends approximately over the full length of the working area A, and a plurality of movable clampers 133 are arranged approximately in an equal interval on a plurality of positions (for example, 20 positions) by causing the clampers to be located opposite to the fixed clamper 132. Thus, the work clamper 132 can clamp the lower edge of the work. On the clamper body 131, a guide 136 for guiding the movement of the movable clampers 133 is provided in a direction of Z while a cylinder 138 is provided as a drive unit for moving the movable clamper 133 along the guide 136. A piston rod 138a of the cylinder 138 is connected to the mounting member 133a attached on the lower portion of the movable clamper 133. Thus, when the cylinder 138 is driven, the movable clampers 133 are moved in a direction of Z along the guide 136, namely in the direction of the clamping and unclamping.

The cylinder 138 is driven by the signal from the control system that will be described later. With respect to all the movable clampers 133, preferably the cylinders 138 are driven in synchronization with each other, and the clamping and unclamping of the work W is conducted approximately at the same time at a plurality of positions. On the fixed clamper 132, there are formed a first gauge portion 132a for positioning the vertical direction (a direction of Y) of the work W by abutting the edge surface of the lower side of the work W, and a second gauge portion 132b for positioning the forward and backward direction (a direction of Z) of the work W by abutting the side surface of the lower side of the work W. The direction of Y and the direction of Z of the work W are positioned by pressing the lower side portion of work W to the first gauge portion 132a and the second gauge portion 132b with the movable clamper 133.

[Second Work Clamper]

On both ends of the work clamper 130, second work clampers 141 and 142 are provided which can freely advance and retreat with respect to the work clamper 130. Though not particularly illustrated, the basic structure of the second work clampers 141 and 142 is the same as that of the work clamper 130. The second work clampers 141 and 142 can be freely moved along the guide rail (not shown) which extends in a direction of X provided on the bed 101. The trigger of the movement and the moving length of the second work clampers 141 and 142 are determined by the control system.

When the end face of the work is worked by cutting the end portion of the work, the second work clampers 141 and 142 are moved in a direction separating from the end of the work clamper 130 so that the work portion to be cut is positioned between the end of the work clamper 130 and the second work clampers 141 and 142. As a result, even in cutting the work, the end of the work is securely clamped, so that the end of the work can be surely cut.

Incidentally, on both ends of the working area A, a positioning member in a longitudinal direction may be provided for arbitrarily positioning the work W in a longitudinal direction (a direction of X) of the work W. On the positioning member in this longitudinal direction, a gauge portion is formed for positioning the work W in the direction of X in contact with the work W. The work W is moved in a direction of X with the work transfer device of the work W which will be described later to press the end portion of the work W to this gauge portion thereby making it possible to position the work W in the direction of X.

[Explanation of the working Device]

Figure 2:
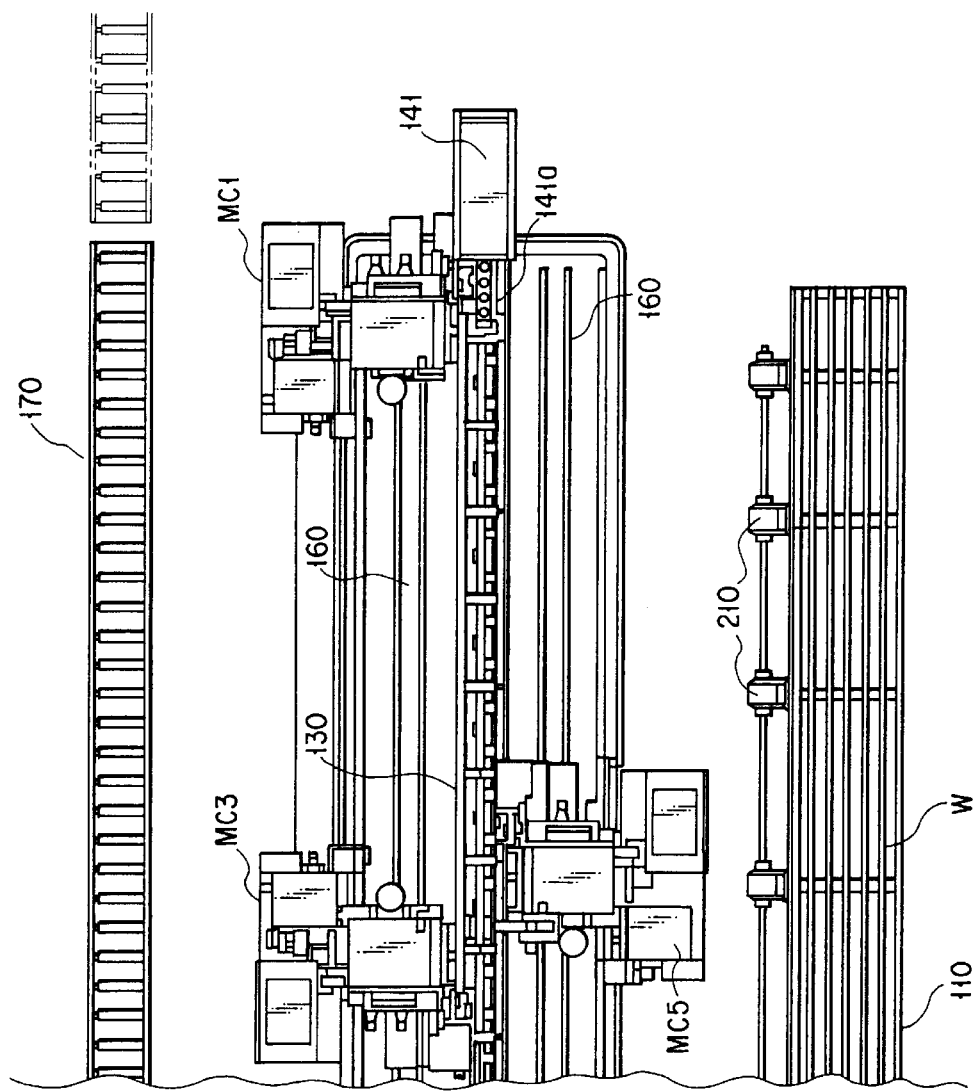
FIG. 2 is a plan view showing a half of the other side of the working machinery for an elongated work according to one embodiment of the present invention.
Figure 5:
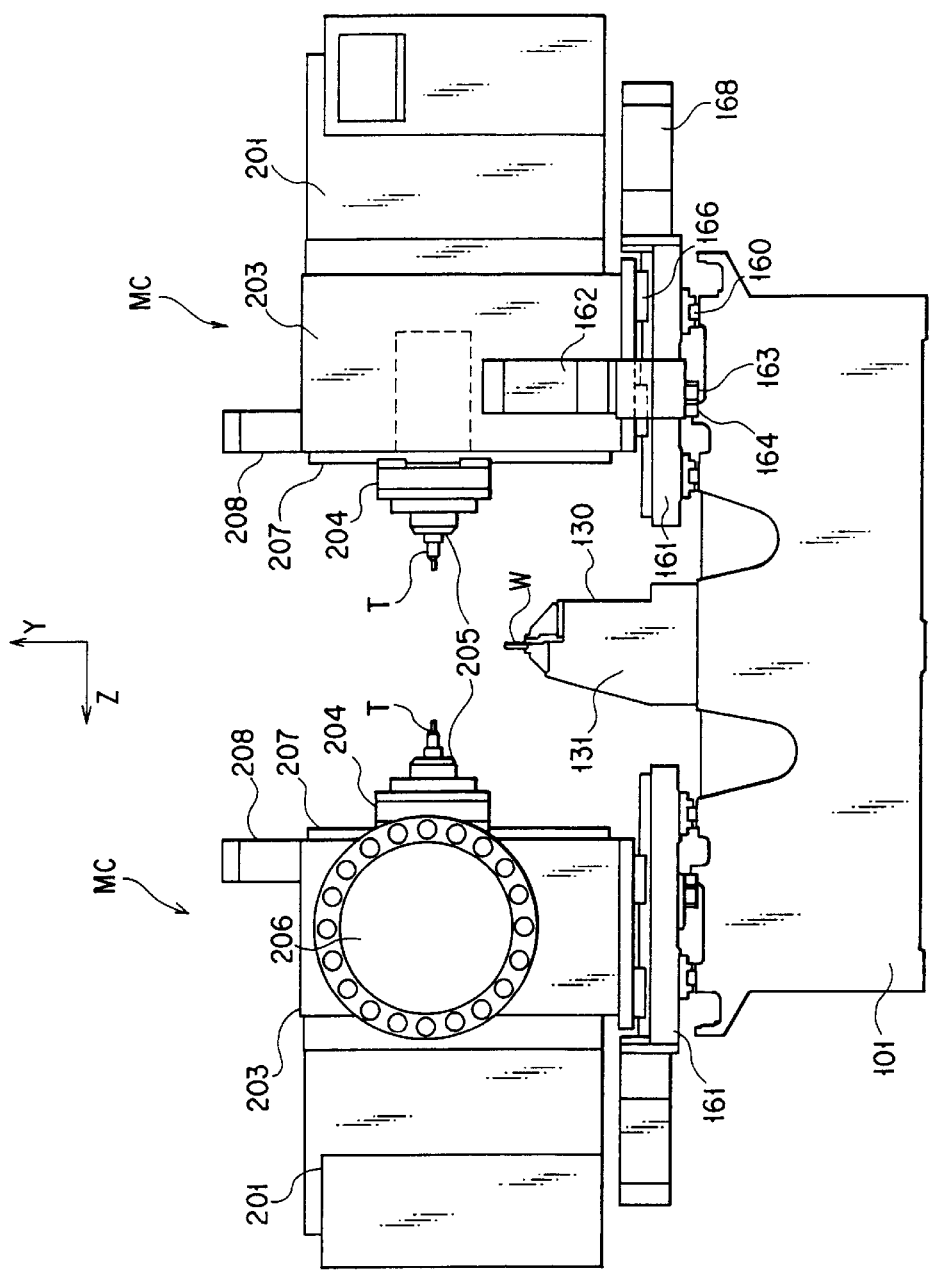
FIG. 5 is a side view for explaining in detail a carriage and a machining center.

As shown in FIGS. 1 and 2 and in FIG. 5, on both sides of the work clamper 130 on the bed 101, a guide rail 160 is provided in the direction of X along the longitudinal direction of the work W clamped with the work clamper 130. On this guide rail 160, a carriage 161 is provided which moves while being guided with the guide rail 160. In this embodiment, on the guide rail 160 on the side of the work stocker 110, two carriages 161 are provided. On the guide rail 160 on the side of the work carrying-out conveyer 170, four carriages 161 are provided. Thus, six carriages 161 in total are provided thereon.

Hereinafter, by referring to FIG. 5, there will be explained working machine for working the work W and a carriage for freely moving the working machine in a direction of X and in a direction of Y. FIG. 5 is a view showing carriages and side surfaces of two machining centers. On each of the carriages 161, machining centers MC1 to MC6 are provided as a working machine for working the work W clamped with the work clamper 130. These machining centers MC1 to MC6 are arranged as shown in FIGS. 1 and 2, for example, in accordance with a priority in the case where interference is generated within the overlapped working range. That is, four machining centers MC1, MC2, MC3 and MC4 are arranged on the side of the work carrying-out conveyer 170. On the side of the work stocker 110, two machining centers MC5 and MC6 are arranged. Furthermore, on the side of the work carrying-out conveyer 170, machining centers MC1 and MC2 are arranged on both sides of the machining centers MC3 and MC4.

Furthermore, on each of the carriages 161, a motor 162 is provided which serves as a drive unit. A pinion 163 mounted on the rotation shaft of the motor 62 is engaged with a rack 164 of the guide rail 160. Consequently, when the motor 162 is driven, the carriage 161 moved in a direction of X along the guide rail 160. On an upper surface of the carriage 161, a guide rail 166 is provided in a direction of Z. The machining centers MC1 to MC6 are placed on the carriage 161 so that the machining centers MC1 to MC6 can be moved in a direction of Z along this guide rail 166. The machining centers MC1 to MC6 are moved in the direction of Z with the motor 168 which is a drive unit attached on the carriage 161.

Each of the machining centers MC1 to MC6 comprises a column 203 moving on a guide rail 166, an main shaft head 204 supported on this column 203, a main shaft 205 rotatably supported on this main shaft head 204, a tool magazine 206 attached on the main shaft 205 for holding many tools T for working a work W and an automatic tool exchanger (ATC) (not shown) for exchanging the tool between this tool magazine 206 and the main shaft 205. On one side of the column 203 facing the work W, a slide surface 207 is formed in a direction of Y. The main shaft head 204 can be freely lifted up and down along the slide surface 207 with a motor 208 provided on the upper portion of the column 203.

In other words, each of the machining centers MC1 to MC6 is put on the carriage 161 moving in an X-direction with being guided by the guide rail 166, and is movable in a Z-direction on the carriage 161. The movement of each of the machining centers MC1 to MC6 in the X-direction and Z-direction is controlled by a NC (numerical control) device 201 provided on the machining centers MC1 to MC6.

Figure 6:
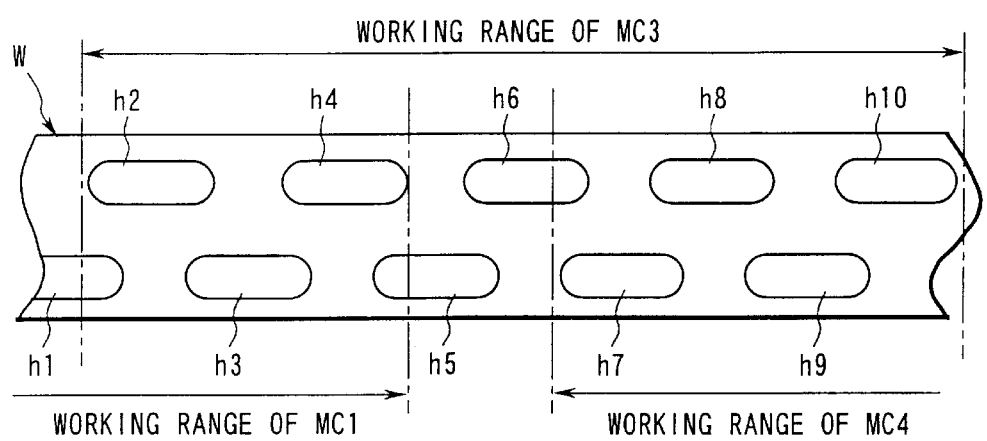
FIG. 6 is a diagram showing a state overlapping working ranges of a machining center.

In this embodiments, the ranges in which the machining centers MC1 to MC6 can work the work, that is, the working ranges of the machining centers MC1 to MC6 are overlapped each other. FIG. 6 shows an example partially overlapping the working ranges of the machining centers MC1 to MC6. In this example, holes h2, h3 and h4 among holes h1 to h10 to be formed in the work can be worked by both of the machining centers MC1 and MC3. The holes h7, h8, h9 and h10 can be worked by both of the machining centers MC3 and MC4. In this manner, when the working ranges of the machining centers MC1 to MC6 are overlapped each other, alposition of the working to the machining centers MC1 to MC6 is performed with a high degree of freedom. Therefore, the working schedule can be formed so that the waiting time of the machining centers MC1 to MC6 is reduced.

[Work Transfer Device]

Figure 7:
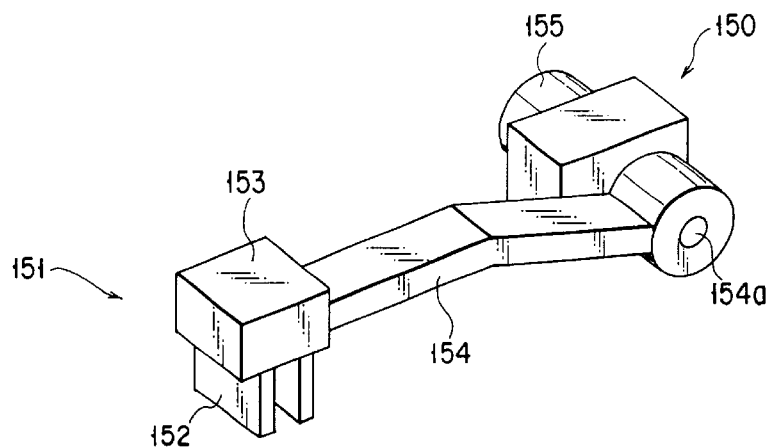
FIG. 7 is a perspective view showing a work transfer device provided on the machining center.

On the machining centers MC5 and MC6, a work transfer device 150 is provided for moving the work w in a direction of X by gripping the work W. FIG. 7 is a perspective view showing a schematic structure of the work transfer device 150 according to this embodiment. This work transfer device 150 has a work grip device 151 comprising a grip hand 152 for gripping the work W and a drive unit 153 for opening and closing the grip hand 152, an arm 154 having the machining centers MC5 and MC6 rotatably mounted on one end and the work grip device 151 mounted on the other end, and a drive unit 155 for index-rotating this arm 154 centering on a shaft 154a provided in the same direction as the direction of X.

When the work w is moved in a direction of X, the index drive unit 155 is driven to rotate the arm 154 from the storage position along the column 203 to the grip position for gripping the work W. Next, the drive unit 153 is driven to close the grip hand 152 and grip the work W. After the work W is gripped in this manner, the clamp of the work W by the work clamper 130 is released, and the machining centers MC5 and MC6 are moved in the same direction along the direction of X at the same speed to move the work W. After the work W is moved in a direction of X in a predetermined distance, the work W is clamped with the work clamper 130. Next, the grip of the work W by the work grip device 151 s released.

[Work Carrying-Out Device]

The work W which is completely worked in the working area A (see FIGS. 1 and 2) is carried out to the work carrying-out conveyer 170 with the work conveyer machine 180. This work conveyer machine 180 comprises a conveyer provided at the back of the machining centers MC1 to MC4.

On this conveyer, the work W is placed to carry out the work W from the working machine 100 for an elongated work to the next step.

[Work Conveyor Machine]

Figure 3:
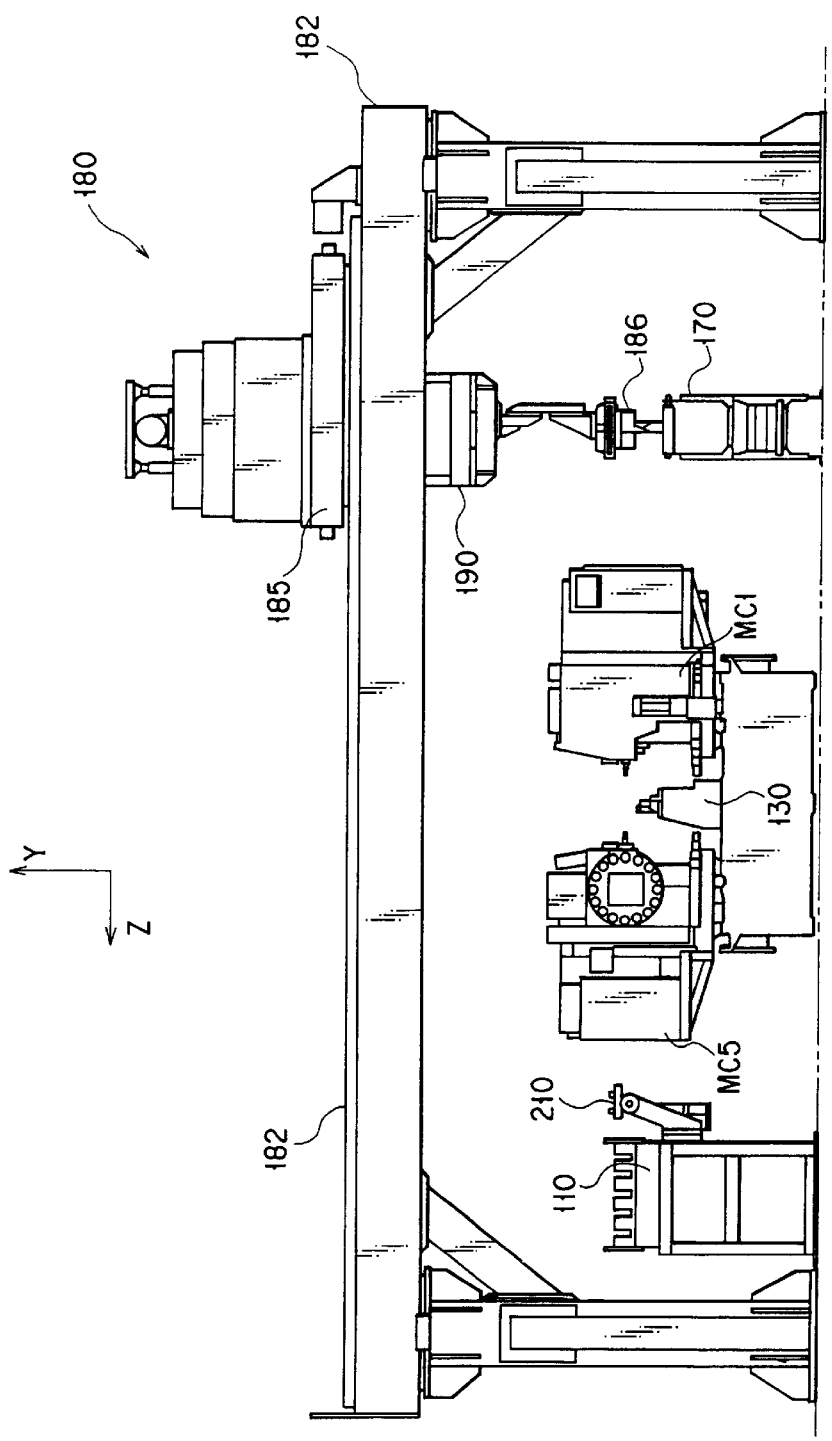
FIG. 3 is a side view showing the working machinery for an elongated work of FIGS. 1 and 2.

As shown in FIG. 3, the work conveyer machine 180 has a guide rail 182 provided from a position above the work stocker 110 up to a position above the work carrying-out conveyer 170 in a direction of X, a moving unit 185 which moves along the guide rail 182, a work grip device 186 provided on this moving unit 185 to grip the work W with a grip hand which is freely opened and closed, and an elevator 190 provided on the moving unit 185 for moving the work grip device 186 up and down.

Figure 8:
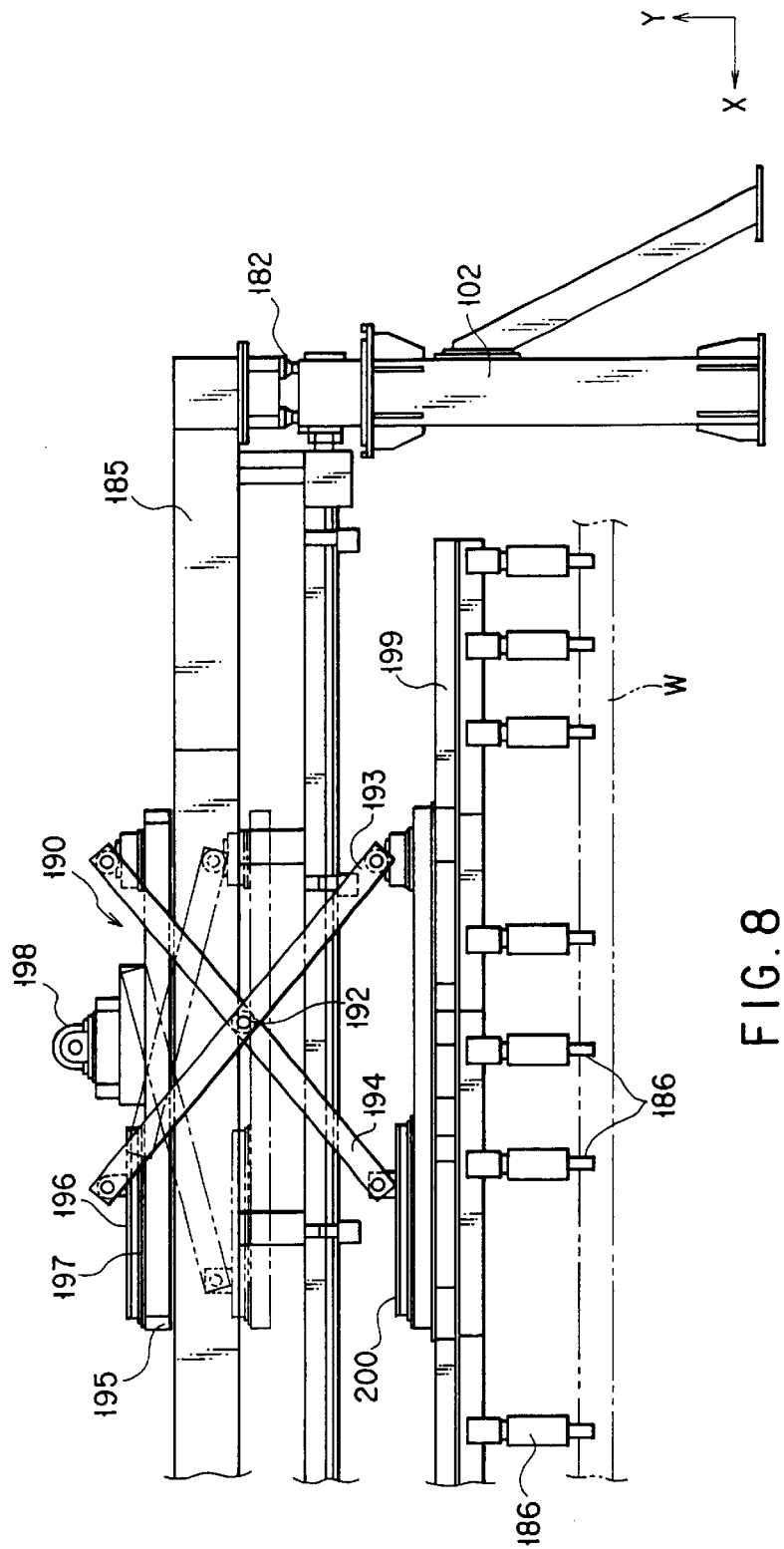
FIG. 8 is a side view showing a work conveyer machine.
Figure 9:
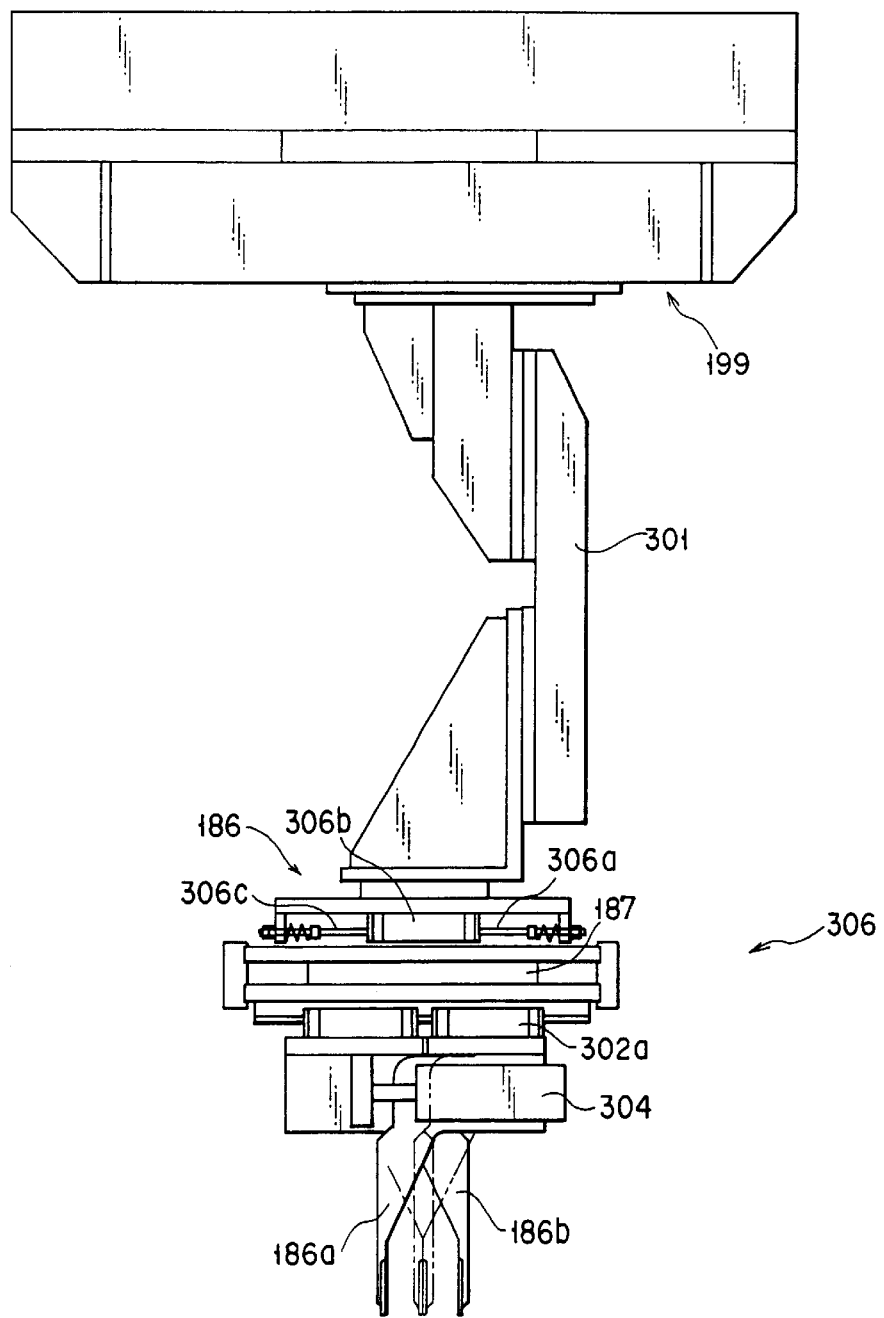
FIG. 9 is a side view showing a work grip device provided on the work conveyer machine for gripping the work.

FIG. 8 is a side view for explaining in detail the elevator 190. FIG. 9 is a side view for explaining in detail a work grip device 186. Incidentally, the elevators 190 are provided at two positions of the moving unit 185 along a direction of X. However, since the structure thereof is unchanged, only one of the elevators 190 is shown in FIG. 8 while the other elevator 190 is not shown.

AS shown in FIGS. 1, 2 and 8, the guide rail 182 in a direction of Z is supported with pillars 102 erected on both sides of the working machine 100 for working the elongated work. The moving unit 185 according to this embodiment comprises a beam-like member running from one of the guide rails 182 to the other guide rail 182 in a direction of X. As described above, the elevators 190 are provided at two positions of this moving unit 185.

The elevator 190 has a pair of arms 193 and 194 which are rotatably intersected at the center with a shaft 192, a base 195 for rotatably supporting one end portions of the arms 193 and 194, a slider 196 which allows one end portion of one of the arms 193 to freely slide on the moving unit 185 in a direction of X, a guide 197 for guiding the slide of this slider 196 in a direction of X, and a motor 198 as a drive body for sliding the slider 196 along the guide 197.

The other ends of the arms 193 and 194 are rotatably attached on the beam-like support member 199 attached on the work grip device 186. Furthermore, the other end of the arm 194 is mounted on the slider 200 provided so as to be freely slided in a direction of X on the support member 199. When the motor 198 is driven to allow the slider 196 to slide in a direction of X, the arms 192 and 193 are rotated in a reverse direction centering on the shaft 192. At this time, since the slider 200 is slided on the support member 199 in the same direction of the slider 196, the rotation of the arms 192 and 193 is not prevented. Thus, the support member 199 is elevated along with the rotation operation of the arms 192 and 193.

Incidentally, the elevator 190 is not restricted to the above form, and the elevator 190 can employ another form. For example, the work grip device 186 may be constituted so as to be allowed to be elevated with a cylinder. However, there is an advantage in that a relatively large elevation stroke can be obtained with respect to the work grip device 186 without increasing the height of the working machine 100 for an elongated work.

Furthermore, the elevators 190 having the above structure also have an advantage facilitating the synchronization of the motor 198 for the elevation in two elevators 190 and the elevation of the work W gripped with the work grip device 186 without tilting the work W.

As shown in FIG. 9, the work grip device 186 is mounted on the support member 199 with the mounting member 301. Preferably, work grip devices 186 may be provided in plurality along the longitudinal direction (direction of X) of the support member 199 at a predetermined interval, so that the elongated work W is gripped securely and a bend is decreased as much as possible to convey the work W.

The work grip device 186 has a pair of grip hands 186*a* and 186*b* which are respectively moved to be opened and closed in a direction of Z, and these grip hands 186*a* and 186*b* have a stroke which allows to sufficiently receive the work W despite the work W is placed either in a horizontal or in a vertical state. At the same time, the work W can be gripped securely by sandwiching the work from both sides. The grip hands 186*a* and 186*b* are slidably provided on the guide 302 in a direction of Z of the grip body 187 mounted on the mounting member 301. The grip hands 186*a* and 186*b* are moved in a direction of Z with the cylinder 304 provided on the grip body 187. Incidentally, reference numeral 306 denotes an absorber for buffering a shock provided between the mounting member 301 and the grip body 187.

As the absorber 306 for buffering this shock, known various forms can be adopted. In this embodiment, the absorber 306 comprises a slider 306*b* which slides along the guide 306*a* extending in the direction of Z, and a spring 306*c* which is energized from both sides so as to locate this slider 306*b* in the center of the guide 306*a* at all times. The slider 306*b* is mounted on the mounting member 301, and both ends of the guide 306*a* is mounted on the grip body 187. In this form, the grip body 187 can be moved by the stroke portion of the slider 306*b* with respect to the mounting member 301 while the shock which may be applied to the grip body with the spring 306*c* is absorbed.

[Explanation of Work Reversing Device]

Since the work clamper 130 as explained in FIG. 4 clamps a portion in the vicinity of the lower end edge of the work W with clampers 132 and 133, a portion where punching or grooving is provided and is located at this portion cannot be worked with the machining centers MC1 and MC6. Then, in this embodiment, as shown in FIGS. 1 and 2, a work reversing device 210 is provided for reversing up side down the work W between the work stocker 110 and the working area A.

Figure 10:
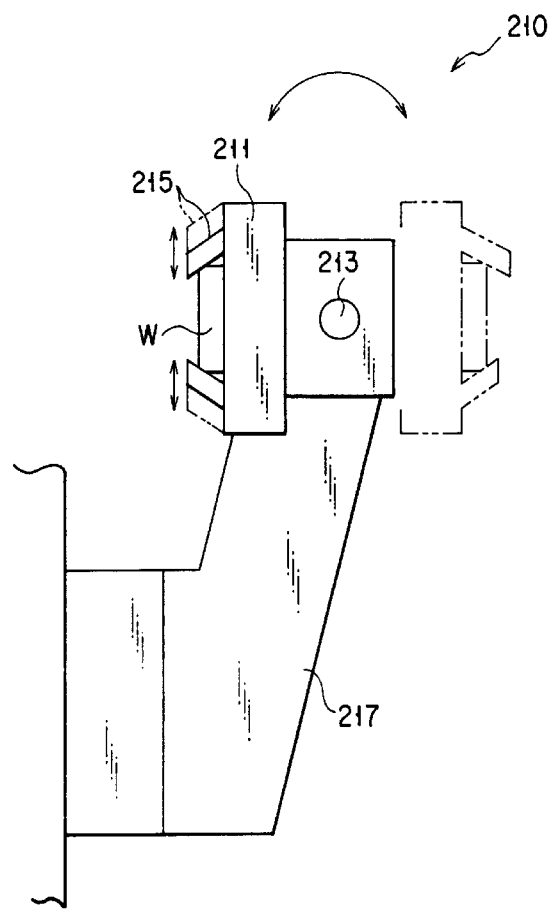
FIG. 10 is a side view showing a work reversing device in this embodiment.

FIG. 10 is a view showing in detail the work reversing device according to this embodiment. As shown in FIG. 10, the work reversing device 210 is supported with the work table 211 for placing the work W and an arm 217 for supporting the work table 211, and has a reverse shaft 213 for reversing and rotating the work table 211 in a direction shown by an arrow in FIG. 10, and a clamp finger 215 for clamping the work W on the work table 211. The plural work tables 211 are provided in an equal interval along the direction of X as shown in FIGS. 1 and 2. The interval between the work tables 211 may be arranged in an interval which does not interfere with the work grip device 186 at the time of the transfer of the work W with the work conveyer machine 180.

The reverse shaft 213 is common with respect to all the work tables 211, and all the work tables 211 are rotated at the same time together with the rotation operation of the reverse shaft 213. This reverse shaft 213 is rotated with the drive of a single D drive unit (not shown) such as a cylinder, a motor or the like. The clamp finger 215 for clamping the work W on the work table 211 is opened and closed with the drive unit (not shown) such as a cylinder or the like which is provided on the work table 211.

Figure 11A:
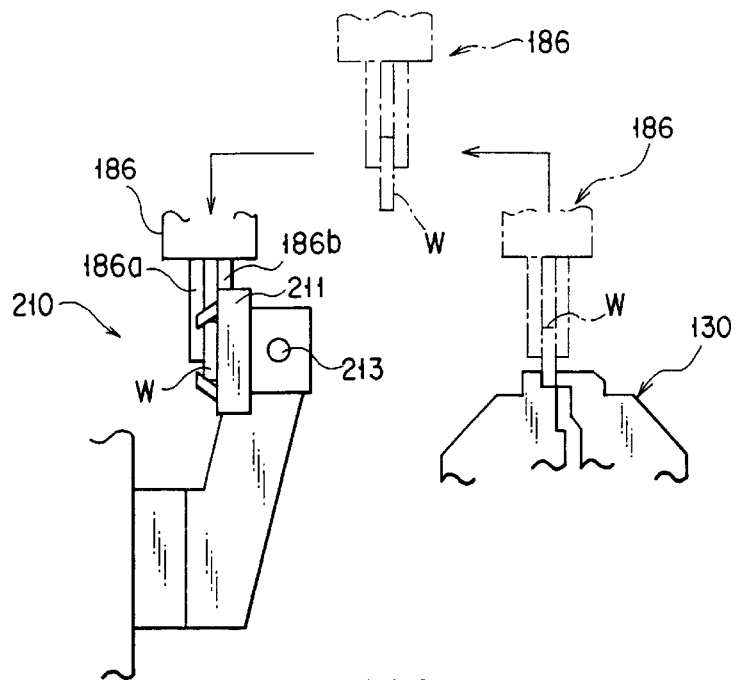
FIGS. 11A and 11B are schematic side views showing a work reverse base which is being operated.
Figure 11B:
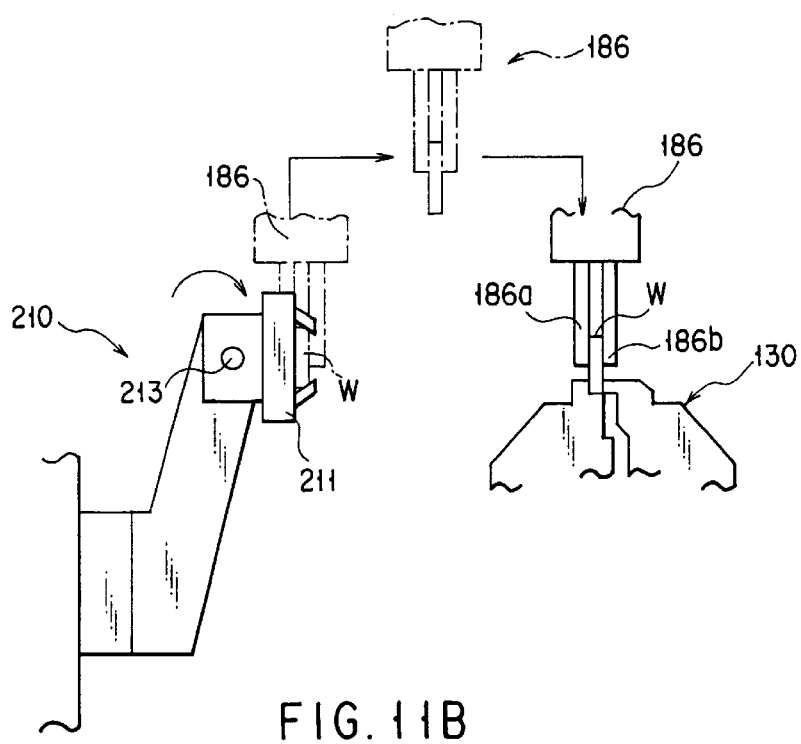

The operation of the work reversing device 210 having the above structure is shown in FIGS. 11A and 11B. As shown in FIG. 11A, the work reversing device 210 in the initial state at the time of the start of the reverse of the work W is directed toward the side of the work stocker 110. When the work grip device 186 of the work conveyer machine 180 grips the work W and transfers it to the work table 211, the clamp finger 215 is closed to clamp the work W. When the work grip device 186 retreats to a position where the work grip device 186 does not interfere with the work table 211, the drive unit is driven to reverse the work table 211 together with the reverse shaft 213 by 180 degrees. Consequently, the work W is reversed up side down. Thereafter, as shown in FIG. 11B, the work grip device 186 grips the work W to transfer the work W with the work clamper 130 to work the lower part of the work W.

Incidentally, in this embodiment, since the elongated work W is stored in a horizontally overlapped state, it is required to change the position of the work W in the horizontal state to a vertical state before transferring the work W to the work clamper 130. However, such position change can be conducted with the work reversing device 210.

By referring to FIGS. 12A and 12B, there will be explained an example in which the work reversing device 210 is used in the position change of the work.

Figures 12A, 12B, 12C, 12D:
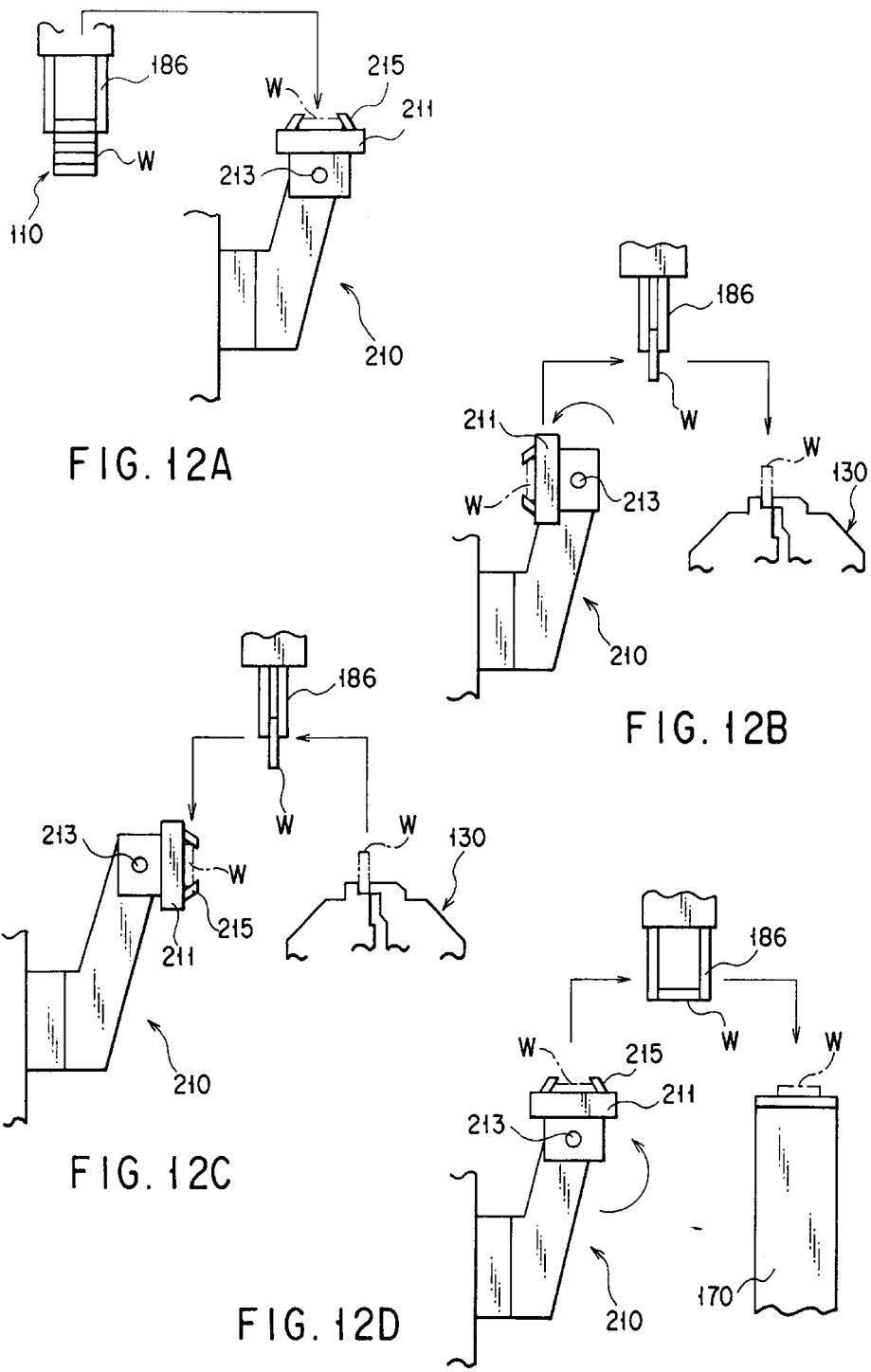
FIGS. 12A, 12B, 12C and 12D are schematic side views showing a work reverse base for explaining a flow of work from a work stocker to a work carrying-out conveyer in the case where the position of the work is changed.

As shown in FIG. 12A, a plurality of works W are stacked and stored in a horizontal state in the work stocker 110. The work conveyer machine 180 widely opens the grip hands 186a and 186b to position the work W on the uppermost layer between the grip hands 186a and 186b. Then, the grip hands 186a and 186b are closed to grip the work W to transfer the work to the work reversing device 210 while maintaining a horizontal state.

The work reversing device 210 waits while maintaining the work table 211 in a horizontal state. In the state, the work reversing device 210 receives the work W from the work conveyer machine 180 to clamp the work W with the clamp finger 215. As shown in FIG. 12B, after the work reversing device 210 clamps the work W with the clamp finger 215, the work table 211 is rotated in either of the right and the left direction to hold the work W in a vertical state. The work conveyer machine 180 receives the work W which is changed in position to a vertical state from the work reversing device 210, and carries the work W into the working area A. The work after this and the reverse of the work W are the same as the previous embodiments.

The work W which is completely worked is carried from the working area A to the work reversing device 210. AS shown in FIG. 12C, the work reversing device 210 waits in the state the work table 211 is rotated to the side of the work stocker 211 or the side of the working area A. In this state, the work W is transferred from the work conveyer machine 180 to the work reversing device 210. The work reversing portion 210 which has received the work W rotates the work table 211 to set the work W in a horizontal state to transfer the work W to the work transfer device 180. The work conveyer machine 180 grips the work W in the horizontal state to transfer the work W to the work carrying-out conveyer 170. Then, as shown in FIG. 12D, the work W is placed on the discharge conveyer 170 in a horizontal state.

[Controller System]

Figure 13:
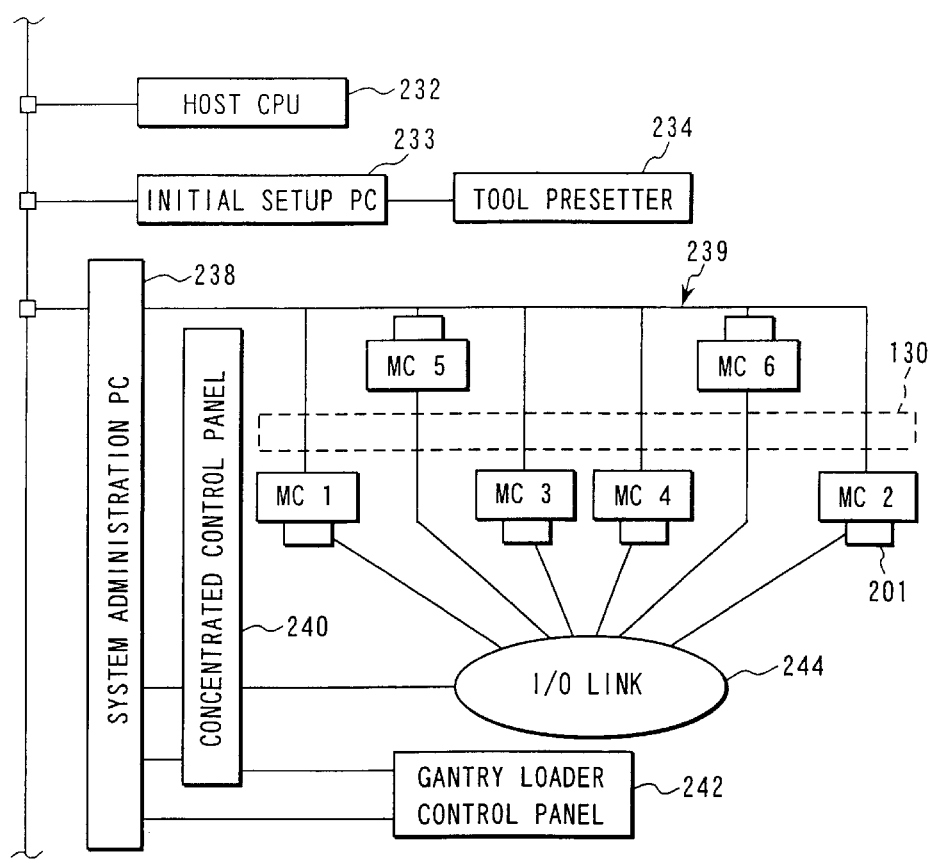
FIG. 13 is a block diagram showing a control system of the working machinery for an elongated work.

Next, there will be explained a control system for operating the working machine 100 for an elongated work according to an embodiment of the present invention. FIG. 13 is a block diagram showing the control system. The control system according to this embodiment is schematically constituted of a host computer 232 for controlling a work w and a work configuration for each work W, an initial setup personal computer 233 having a tool preparation list file in accordance with the work configuration to be applied to work W, and a system control PC (personal computer) 238 for generally controlling the working of the work W by the machining centers MC1 to MC6 and the carrying-in and carrying-out of the work W. That is, the initial setup PC 233 prepares the tool in accordance with an instruction associated with the work W from the host computer 232 and the working to be applied to the work W, and the system control PC 238 controls an actual working.

The host computer 232 stores the kind of the work W, stacked data on the material, and the working form for each work W, and outputs data by the request from the system control PC 238 so as to work the work W in an order in accordance with the working schedule based on the production control program. The initial setup PC 233 is connected to a tool presetter 234 for conducting a preparation work of the tool. This tool presetter 234 prepares the tool in accordance with the working configuration based on the instruction from the initial setup PC 233 and measures and sets the length of the tool and the diameter of the tool.

The system control PC 238 is connected to a concentrated control panel 240 for controlling the start-up and stop of the working machine 100 for an elongated work, a loader control panel 242 for controlling the work conveyer machine 180, and an NC device 201 respectively mounted on the machining centers MC1 to MC6. The NC program prepared with the system control PC 238 on the basis of the work W and the working form of the work W is distributed to the NC device 201 of each of the machining centers MC1 to MC6 via a communication line 239. Each of the machining centers MC1 to MC6 performs a predetermined working in accordance with the distributed program.

The information such as working advance or current position of each of the machining centers MC1 to MC6 is transmitted to a system control computer 238 via a communication line 239. The system control computer 238 controls the movement of the machining centers MC1 to MC6 in the X- and Z-directions

[Operation]

Figure 14:
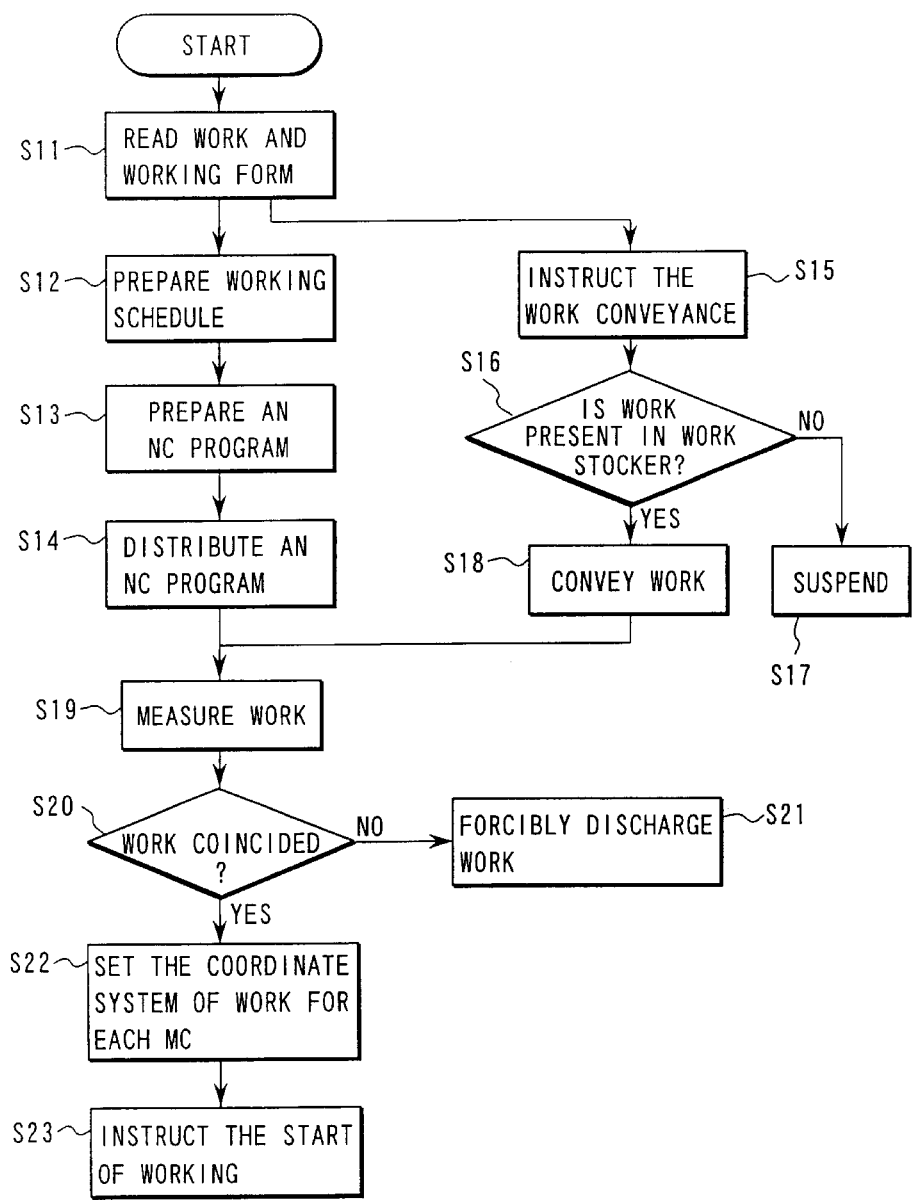
FIG. 14 is a flowchart for explaining an action of the working machinery for an elongated work at a preparation stage before the working of the work.
Figure 15:
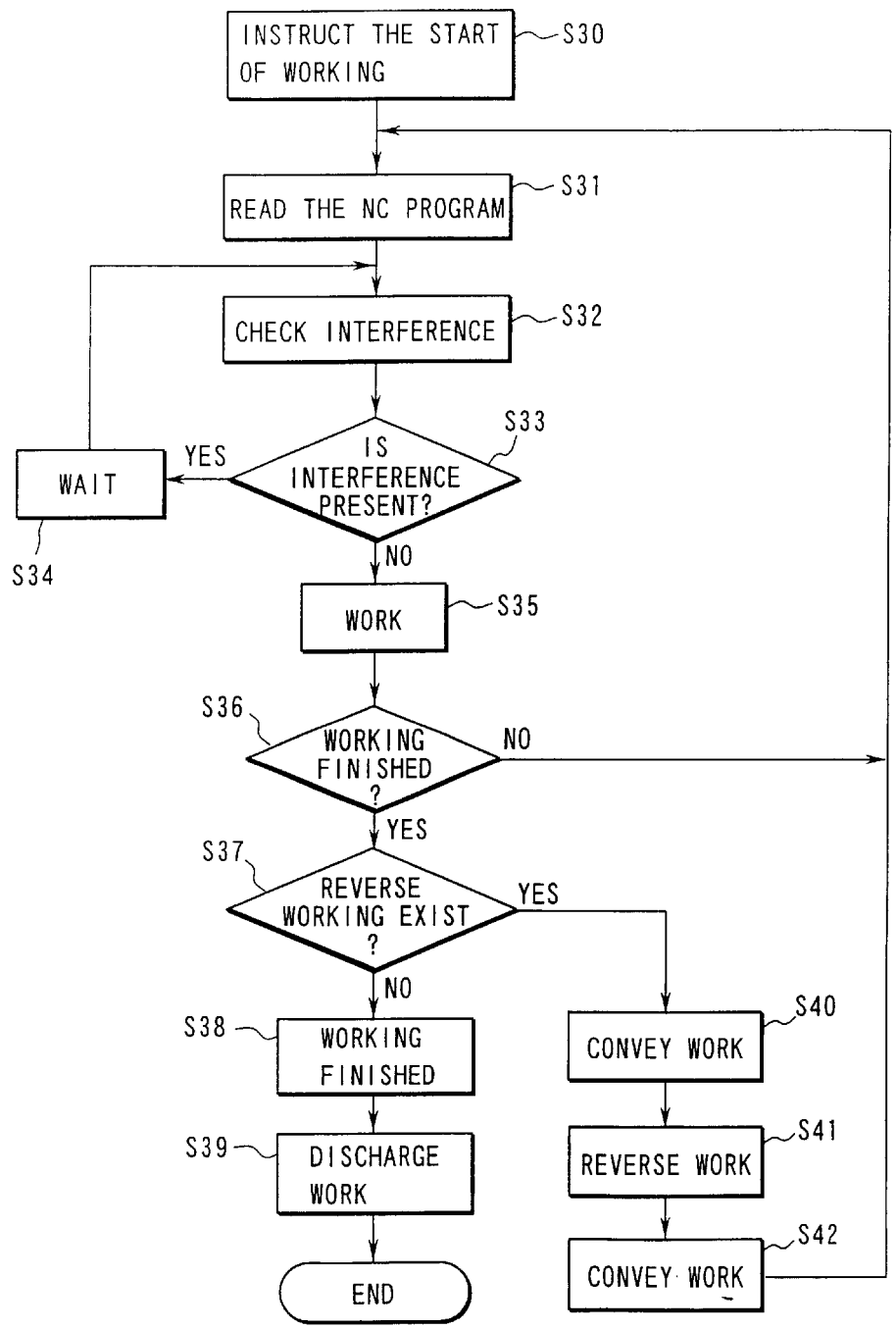
FIG. 15 is a flowchart for explaining an action of the working machinery for an elongated work at a working stage of the work.
Figure 16A:
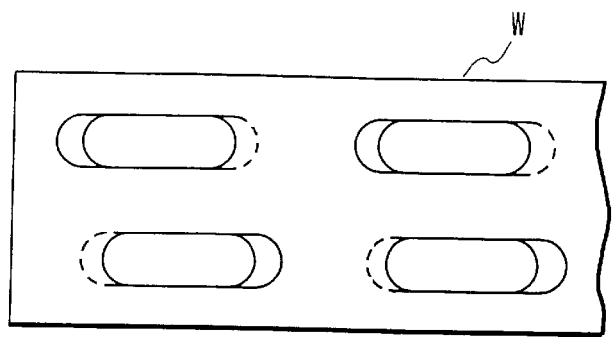
FIGS. 16A, 16B, and 16C are views showing one example of punching, grooving, edge working applied to the work for forming a rotor coil and a guide tube.
Figure 16B:
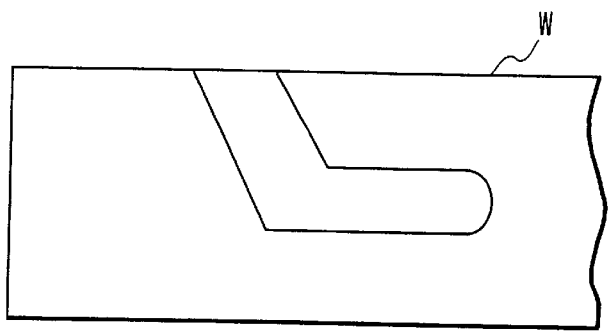
Figure 16C:
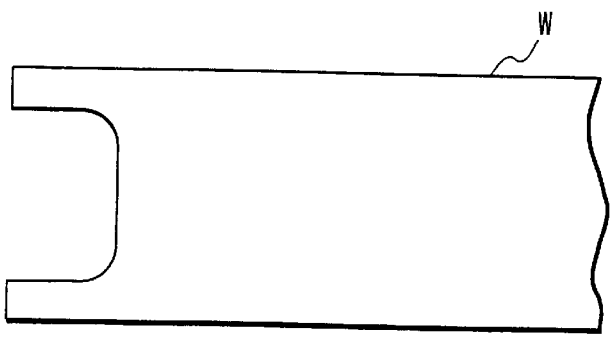

Hereinafter, by referring to the flowchart of FIGS. 14 and 15, there will be explained a procedure for the working by the rotary coil working machine 100 having the above structure.

In the beginning, a procedure at this preparation step before the start of the working will be explained in accordance with the flowchart of FIG. 14.

Data on the order of the working of the work W stored in the work stocker 110, the size of each part of each work W, the kind and form of work W is stored in the memory of the host computer 232 in advance. When the working machine 100 for an elongated work is started up, the work w to be worked at first is read from the memory. At the same time, each kind of data on the work W is transmitted to the system control PC 238 (step S11).

The initial setup personal computer 234 controls the preparation work of the tool used in MC1 to MC6 through communication with the system control computer 238 to receive the tool data measured with the tool presetter. In the system control computer 238, for example, a working program including the working order in the case where the working order of punching and grooving, the working program for punching and grooving and the interference of the work clamper are generated prepares a working schedule which is required for the working of the work W from each kind of data input from the host computer 232 (step S12), and prepares the NC program of each of the machining centers MC1 to MC6 on the basis o this working schedule (step S13). This NC program is prepared for each of the machining centers MC1 to MC6 in accordance with the working division of each machining centers MC1 to MC6 in the work W to be distributed to each of the machining centers MC1 to MC6 via the communication line 239 (step S14).

Incidentally, in the preparation of the working schedule at step S12, for example, various conditions such as priority or the like is changed in the case where the alposition of working such as punching and grooving which should be shared by each of the machining centers MC1 to MC6, the working order and interference are generated. Thus, a plurality of working schedules are prepared, and the working is simulated on the basis of this working schedule so that the working schedule may be selected in which the working time becomes the shortest.

The system control computer 238 outputs a conveyance instruction of the work W to the loader controller 242 on the basis of the stacked data on the material from the host computer 232(step S15). The loader controller 242 judges whether or not the work W is positioned at a predetermined position of the work stocker 110 (step S16). In the absence of the work W, the carrying work of the work W by the work conveyer machine 180 is suspended (step S17). In the case where the work W is located at a predetermined position, the work conveyer machine 180 conveys the work W in the working area A on the basis of the carrying instruction (step S18). When the work W is conveyed to the working area A with the work conveyer machine 180, a work clamp instruction is output to the work clamper 130 with the loader controller 242 so that the work W is clamped with the work clamper 130. It is determined with a sensor provided on the machining centers MC1, MC2 or the machining center MC4 as to whether the work W is present in accordance with the working order in the working area A (step S20). When it is determined that no work w is present on the basis of the working order, the work W is forced to be carried out (step S21) to suspend the working machine 100 for an elongated work.

It is determined as to whether the work W is present in accordance with the working order in the working area A by measuring, the size of each part of the work W, for example, the full length, the full width and the thickness of the work W. Furthermore, in the case where the work W is present in accordance with the working order, it is possible to determine the reference coordinates position in the directions of X, Y and Z of the work W.

The work W may be measured by providing a dedicated measuring device on the working area A. In this embodiment, a touch sensor is automatically mounted on the main shaft 205 of the machining center MC1, MC2 and MC4 with the automatic tool exchanger (ATC). The machining centers MC1, MC2 and MC4 are moved to allow the touch center to come into contact with the predetermined position of the work W from each direction of X, Y and Z. The size of each part of the work W is measured from the coordinates position of the machining centers MC1, MC2, MC4 while the reference coordinate position is calculated which forms a reference of the working of the machining centers MC to M6.

When the work W coincides, the coordinate system is set for working the work W for each of the machining centers MC to M6 (step S22).

When the above procedure is completed, the working of the work w is started with the working data sent to each of the machining centers M1 to MC6 from the system control computer 238 (step 23).

Next, there will be explained a procedure for working the work W by each of the machining centers MC1 to MC6 in accordance with the flowchart of FIG. 14. With an instruction on the start of working (step S30), the working is conducted with the machining centers MC1 to MC6 in accordance with the working program.

Next, there will be explained a procedure for working the work W by each of the machining centers MC1 to MC6 in accordance with the flowchart of FIG. 15. With an instruction on the start of working (step S30), the working is conducted with the machining centers MC1 to MC6 in accordance with the working program. The working of the work W is conducted by reading the NC program into the buffer for each predetermined length (step S31).

The system control computer 238 constantly monitors the current position of each of the machining centers MC1 to MC6. From the working program of each of the machining centers MC1 to MC6 and the current position of each of the machining centers MC1 to MC6, the interference of each of the machining centers MC1 to MC6 is determined (step S32). As a consequence, when the current working is continued, the machining center which has determined that the interference is generated (step S33) is allowed to wait until no fear remains that the interference is generated while the other machining center is allowed to continue working (step S34). After a certain time, the current position of the machining center is confirmed again and an interference check is conducted (step S32). As a consequence, when there is no fear of interference, the wait state is released to conduct the working of the work K (step S35).

For example, when the machining center MC3 is moved to the overlapping area for conducting the next working in the case of working an area where the machining center MC1 and the machining center MC3 are overlapped with each other, the working of the machining center MC1 whose priority order is set to an upper order in advance is conducted to set the machining center MC3 in an wait state in the case where it is determined that the machining center MC3 interferes with the machining center MC1 which is being currently worked.

Next, it is determined from the working program as to whether the working of the work W is completed (step S36). When the working is not completed, the NC program is subsequently read to conduct working by the machining centers MC1 to MC6. When the working is completed, it is determined as to whether the reverse working of the work W is conducted (step S37). In the case of the reverse working, the work w is conveyed to the work reversing device 210 with the work conveyer machine 180 (step S40). Then, the work W is reversed (step S41). The work conveyer machine 180 grips the reversed work W to convey the work W to the working area A and transfer the work W to the work clamper 130 (step S42). Thereafter, the working on the other side of the work W is conducted in accordance with the procedure at steps S31 to S35.

When the reverse working of the work W is not conducted, the working is completed (step S38). The work W is conveyed to the conveyer 170 with the work conveyer machine 180 to carry out the work W to the next step (step S49). Thereafter, the above procedure is repeated for each of the work W.

The embodiments of the present invention have been explained, but the present invention is not limited to the above embodiments. For example, it has been explained that the working machinery for working the work is a machining center. However, the working machine is not limited to the machining center and the other working machinery that is moved in a direction of X and in a direction of Z to work the work from both sides will be employed in addition to the machining centers.

Furthermore, the preferred embodiment may be constituted in such a manner that the working machinery is not moved in a direction of Z and the main shaft of the working machinery attached with a tool advances and retreats in a direction of Z. Furthermore, it has been explained that six machining centers MC1 to MC6 are provided on both sides of the work clamper 130. Two to five working lower stages or seven or more working stages are appropriately allocated and arranged on both sides of the work clamper 130.

Furthermore, it has been explained that the carrying-in and carrying-out of the work W to and from the working area A is conducted with one work conveyer machine 180. It is also possible to carry in and carry out the work W with a different conveyer machine. By doing so, there is an advantage in that the work W can be carried in immediately after the work W is carried out, and the working time can be shortened.

Furthermore, the work transfer device for moving the work in the longitudinal direction is not limited to what is explained. For example, on both end of the working area A, the work transfer device may be constituted of a contact device which contacts the end portion of the work W and a drive unit such as ball screw and nut mechanism for pressing the contact device to the work W in a direction of X. In this case, the end portion of the work W may be pressed with the work transfer device in the state in which the work W is lightly clamped with the work clamper 130.

Furthermore, it has been explained that the work reversing device 210 is provided between the work stocker 110 and the working area A. The work reversing device 210 may be provided between the work carrying-out conveyer 170 and the working area A. Otherwise, the work reversing device may be provided on both the work carrying-out conveyer 170 and the working area A.

According to the present invention, since the work can be automatically worked while automatically sending the work to the working area of the working machinery for an elongated work, the work efficiency can be improved and safety of work can be secured.

Furthermore, the work is positioned in advance in the working area to be clamped. At the same time, the working machinery such as a machining center or the like works the work while moving along the longitudinal direction of the work. Thus, it becomes unnecessary to send the work in the longitudinal direction and an attempt can be made to reduce the size of the working machinery for an elongated work.

Furthermore, a plurality of working machines work a plurality of positions of the work which is positioned in advance in the working area at the same time from both sides. Thus, the working efficiency is improved and the working time of the work can be largely shortened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Working machinery for working an elongated work, comprising:
   a work stocker configured to store a plurality of elongated works, each having a width and a thickness, in rows and steps in a state in which the works are horizontally stacked;
   a work carrying-in machine configured to carry in each elongated work of the elongated works from the work stocker to a working area;
   a positioning device configured to position the elongated work in the working area;
   a work clamper including a fixed clamper extending approximately over the full length of the working area and a plurality of movable clampers arranged at substantially equal intervals, the movable clampers located opposite to the fixed clamper and moving to clamp and unclamp the elongated work in a vertically erected state between the fixed clamper and the movable clampers;
   a plurality of working machines arranged on both sides of the work clamper to work the elongated work at respective working positions from both sides of the elongated work;
   a plurality of driving devices configured to move the working machines respectively to the respective working positions along a longitudinal direction of the elongated work;
   a controller configured to control the working machines and the driving devices; and
   a work carrying-out machine configured to carry out the elongated work which is completed in working from the working area.

2. The working machinery according to claim 1, wherein the driving devices move the working machines so that working ranges of the working machines overlap each other.

3. The working machinery according to claim 2, further comprising an interference preventing device configured to determine whether or not the working machines interfere on the basis of a working program for the working machines in which the working ranges overlap each other, continuously perform the working of one of the working machines when interference is generated and set the others of the working machines to a wait state until no interference is generated.

4. The working machinery according to claim 1, further comprising a work reversing device configured to reverse the elongated work upside down, the work carrying-in machine or the work carrying-out machine conveying and transferring the elongated work from the work clamper to the work reversing device to make the elongated work reverse and receiving a reversed work to transfer the reversed work to the work clamper.

5. The working machinery according to claim 1, further comprising a longitudinal direction positioning device provided on at least en one side of the work clamper and configured to position a longitudinal side of the elongated work clamped by the work clamper.

6. The working machinery according to claim 1, further comprising a second work clamper which advances and retreats along the longitudinal direction, the second work clamper being provided at least on one end side of the work clamper and moved to a position in the vicinity of a worked portion of the elongated work to clamp the elongated work at the time of working an edge portion of the elongated work.

7. The working machinery according to claim 1, wherein the work carrying-in machine and the work carrying-out machine are integrally constructed as a single work conveyer machine.

8. The working machinery according to claim 1, further comprising:
   a work grip device configured to grip the elongated work;
   an arm supporting the work grip device and rotatably mounted on each of the working machines;
   a drive unit configured to rotate the arm and set the work grip device in a movable state between a storage position free from interference with the elongated work which is being worked and a grip position where the elongated work can be gripped; and a work transfer device configured to move in the longitudinal direction the elongated work gripped with the work grip device along with movement of the working machines.

9. The method according to claim 1, wherein the working machines have respective working ranges which are overlapped with each other, and a portion of the work which corresponds to an overlapped portion of the working ranges is worked with one of the plurality of working machines whose working ranges overlap.

10. The method according to claim 9, further comprising:

predicting from a working program of each of the working machines as to whether each of the working machines interferes with the other working machines; and continuously performing the working of one of the interfering working machines in accordance with a preset priority order in the case where it is determined that interference is generated while the other working machines are set to a wait state.

11. A method for working an elongated work having a width and a thickness, comprising:

carrying the elongated work into a working area from a work stocker in which a plurality of elongated works are stored in rows and steps in a state in which the works are horizontally stacked;

clamping the elongated work in a vertically erected state in the working area between a fixed clamper and a plurality of movable clampers, the fixed clamper extending approximately over the full length of the working area, and the movable clampers being arranged at substantially equal intervals on a plurality of positions and moving to clamp and unclamp the elongated work with respect to the fixed clamper;

arranging a plurality of working machines on both sides of the elongated work;

moving the working machines to respective working positions along a longitudinal direction of the elongated work;

working the elongated work at the respective working positions in the working area by means of the working machines; and carrying out from the working area the elongated work completely worked.

12. A method for working an elongated work according to claim 11, further including providing a work reversing device outside of the working area, and reversing the work upside down with the work reversing device to work the other side of the work after the working of one side of the work is finished.

13. The method according to claim 11 further comprising:

preparing a working program in advance for each of a plurality of working forms;

preparing at least one working schedule through a combination of the work forms with respect to each of the works;

allocating at least one of the work forms to each of the working machines on the basis of this working schedule;

preparing a working program for working the work for each of the working machines from the working program corresponding to the working schedule and the allocated one of the working forms; and distributing the prepared working program to the working machines.

14. The method according to claim 13, wherein: preparing the working schedule includes preparing a plurality of working schedules by changing the combination of the working forms and the working forms allocated to the working machines with respect to each of the works, and simulating the plurality of working schedules to retrieve a working schedule shortest in working time from the working schedules; and preparing the working program includes preparing the working program in accordance with the working schedule allocated in this retrieval.

15. The method according to claim 11, wherein clamping the elongated work includes preparing a plurality of work clampers for clamping the elongated work in the working area, and moving one of the work clampers that is located at the end portion of the working area to the end portion of the elongated work along the longitudinal direction to clamp the end portion of the elongated work at an arbitrary position.

16. Working machinery for working an elongated work comprising:

a work stocker which stores a plurality of elongated works, each having a width and a thickness, in rows and steps in a state in which the works are horizontally stacked;

a work carrying-in machine which carries in each elongated work of the elongated works from the work stocker to a working area;

a positioning device configured to position the elongated work in the working area;

a work clamper including a fixed clamper extending approximately over the full length of the working area and a plurality of movable clampers arranged at substantially equal intervals, the movable clampers located opposite to the fixed clamper and moving to clamp and unclamp the elongated work in a vertically erected state between the fixed clamper and the movable clampers;

a plurality of working machines arranged on both sides of the work clamper and movable in a longitudinal direction of the elongated work to work the elongated work at respective working positions;

a working machine driver which moves the working machines to the respective working positions along the longitudinal direction of the elongated work; and a work carrying-out machine which carries out from the working area the elongated work completely worked.

17. The working machinery according to claim 16, wherein the working machines are movable in a width direction of the elongated work.

18. The working machinery according to claim 16, further comprising:

a controller which controls the working machine driver to drive the working machines according to a working program.

* * * * *